(12) United States Patent
Li

(10) Patent No.: US 6,754,283 B1
(45) Date of Patent: Jun. 22, 2004

(54) HIGH SPEED TRELLIS ENCODING FOR DISCRETE MULTITONE TRANSCEIVERS

(75) Inventor: Hsiang-Ling Li, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 688 days.

(21) Appl. No.: 09/688,258

(22) Filed: Oct. 13, 2000

(51) Int. Cl.$^7$ ................................................ H04L 5/12
(52) U.S. Cl. ...................... 375/265; 375/341; 714/792
(58) Field of Search .......................... 375/130, 141, 375/265, 150, 259, 341, 298, 288, 290, 261; 714/755, 758, 792

(56) References Cited

U.S. PATENT DOCUMENTS

| | | | | |
|---|---|---|---|---|
| 5,258,987 A | * | 11/1993 | Wei | 714/758 |
| 5,555,268 A | * | 9/1996 | Fattouche et al. | 375/141 |
| 5,790,570 A | * | 8/1998 | Heegard et al. | 714/755 |
| 6,034,996 A | * | 3/2000 | Herzberg | 375/265 |
| 6,192,068 B1 | * | 2/2001 | Fattouche et al. | 375/130 |

* cited by examiner

*Primary Examiner*—Stephen Chin
*Assistant Examiner*—Ted Wang
(74) *Attorney, Agent, or Firm*—Farjami & Farjami LLP

(57) ABSTRACT

A three-stage four-dimensional encoding system and method for DMT-based transceivers includes a first stage where a parallel shifter shifts three bits of input data bits from a shadow register into a holding register. Next, a convolutional encoder generates encoded bits v1, v0, w1 and w0, using the three bits in the holding register. The encoded bits w1 and w0 may be registered as w1' and w0' for later use. In the second stage, the encoded bits v1 and v0 are provided to the inputs of the parallel shifter for parallel parsing of bits for the first tone of a pair of tones of DMT and the number of bits needed for the first tone are parallel shifted to the holding register. The bits in the holding register are then mapped by a constellation mapper into a constellation point. In the third stage, the encoded bits w1' and w0' are provided to the inputs of the parallel shifter for parallel parsing of bits for the second tone of the pair of tones and the number of bits needed for the second tone are parallel shifted to the holding register. The bits in the holding register are then mapped by a constellation mapper into a constellation point.

19 Claims, 9 Drawing Sheets

HIGH SPEED TRELLIS ENCODING FOR DISCRETE MULTITONE TRANSCEIVERS

BACKGROUND OF THE INVENTION

1. Field of the Invention

The present invention relates generally to communications systems. More particularly, the present invention relates to trellis encoding for discrete multitone transceivers.

2. Background

The recent explosion of the Internet has created an intense need for a higher data transmission rate. Applications such as web surfing, e-mail, news-group, chat rooms, and the like, have become a common part of many people's lives. As the demand grows and applications such as multicast video-on-demand, high-resolution Internet gaming, and video conferencing become more commonplace, the traditional modems do not have enough bandwidth to serve such needs. As a result, the broadband digital subscriber line ("DSL") modems that use a bandwidth beyond the voice band have become a key to future broadband access.

Among the many DSL technologies, asymmetric DSL ("ADSL") is one of the most popular choices in meeting the broadband access needs. Reasons for this include coexistence with the plain old telephone service ("POTS"), based on existing wired infrastructure, substantial availability for the current POTS subscribers, up to 8 Mbits/sec downstream speed and 640 kbits/sec upstream speed, and always connected.

ADSL uses the existing local loop to deliver high-bandwidth services. At each end of the circuit, modems are installed, which make possible the promise of ADSL. These modems create a high-bandwidth downstream channel, a smaller upstream channel and a basic telephone service channel for voice. The actual bandwidth provided is dependent on the length of the local loop. In a typical ADSL installation, service modules (set-top boxes, routers, PC interface devices) attach at the customer premises to the premises distribution network ("PDN"). The PDN is the premises wiring scheme that interconnects customer premises equipment to the local loop. The PDN is attached to a remote ADSL transmission unit ("ATU-R"), which in turn is connected to the local loop using a splitter. The splitter performs the logical separation of voice and data traffic.

At the network side of the circuit, the loop terminates at another voice-data splitter, which in turn is connected to a central ADSL transmission unit ("ATU-C"). The ATU-C is connected to the access node, which is the aggregation point for broadband and narrowband data sources delivered from a DSL access multiplexer ("DSLAM"). DSLAM allows TV signals, interactive video, Internet access and a wide variety of other data types to share access to the ADSL-equipped local loop.

ADSL relies on frequency division multiplexing to create the independent basic telephone service, upstream and downstream channels. ADSL establishes a channel at the low end of the spectrum for voice; a medium frequency band for the upstream channel; and a higher frequency band for the high-bandwidth downstream channel. In some cases, the channels may overlap. This technique is called partially overlapped echo-canceled transmission ("POET").

Two signal modulation techniques have been developed for use in ADSL implementations to achieve the very high bit rates that the service promises. The first, called carrierless amplitude phase modulation ("CAP"), is similar to quadrature amplitude modulation ("QAM"), a technique that has been in existence for quite some time. The second technique used in ADSL systems is called discrete multitone ("DMT"). In DMT, the 1.1 MHz channel is broken into 256 4-kHz sub-channels, hence the term, "multitone." Each sub-channel has its own carrier, and the signal-to-noise ratio is constantly monitored by the DMT system to determine how many bits-per-tone can be carried in each sub-channel. The DMT system dynamically adjusts each channel, thus, resulting in a technique that is by its very nature dynamically rate adaptive. If certain frequency ranges in the spectrum of sub-channels are noisy, they are not used. DMT is the broadly accepted coding standard for ADSL, and is significantly more complex than CAP.

Four-dimensional trellis coded modulation ("4D-TCM") is a coding technique that is used to enhance the overall performance of DMT-based transceivers for ADSL. The basic idea of 4D-TCM is to combine coding and modulation. 4D-TCM consists of a convolutional code that adds forward error correction to the DMT modulation scheme by adding an additional bit to each baud. Convolutional coding is used to introduce a dependency between successive signal points such that only certain patterns or sequences of signal points are permitted.

FIG. 1a illustrates a conventional modulation and encoding system 100 of an ADSL modem. FIFO 110 receives and buffers an input bit stream 105 of data bits for each DMT tone. The number of bits carried by a DMT tone are determined based on the signal-to-noise ratio. As stated above, each DMT tone might carry a different number of data bits, ranging from 0 to 15, depending upon each particular sub-channel condition.

Four-dimensional TCM encoding is performed on each consecutive pair of tones. For purposes of describing the conventional modulation and encoding method, b1 denotes the number of bits in the first tone and b2 denotes the number of bits in the second tone, where $b2 \geq b1$, according to ADSL standard. The conventional method retrieves b1 and b2 (whose derivation is not described here), for example, from a lookup table. For the downstream direction, the lookup table may include 256 entries, i.e., one entry per each sub-channel or tone. Now, once b2 and b1 are retrieved, the modulation and encoder system must determine the number of bits to be read from FIFO 110. As stated above, because convolutional coding adds an additional bit to each baud, the conventional method must calculate the value of (b1+b2−1) and request the same number of bits from FIFO 110. According to the conventional method, b1+b2−1 bits are received from FIFO 110 by input shift register 120 and shifted serially to the right, one bit at a time, for trellis encoding purposes. As a result, b1+b2−1 system clock cycles are used to serially shift the necessary number of bits, i.e., one cycle per serial shift.

FIG. 1b illustrates the operation of shift register 120 according to the conventional method. Referring to FIG. 1b, assuming b1=3 and b2=6, the encoding and modulation system must first calculate the number of bits needed to be read from FIFO 110 for trellis encoding purposes. As stated above, the number of bits are calculated based on the formula b1+b2−1=3+6−1=8, and eight bits are read from FIFO 110 and received by input shift register 120. Assuming tone 1 consists of three bits x0, x1 and x2, and tone 2 consists of six bits y0, y1, y2, y3, y4 and y5, eight bits x0, x1, x2, y0, y1, y2, y3 and y4 are shifted serially to the right by the input shift register 120, one-by-one, for trellis encoding purposes. In other words, eight serial shifts to the right must be performed, thus, taking eight clock cycles to parse or obtain the required number of bits.

Referring back to FIG. 1a, the first three bits x0, x1 and x2 are utilized by a 16-state Wei's convolutional encoder to generate bits v1, v0, w1 and w0 (whose derivation is beyond the scope of the present discussion). Next, trellis encoder 130 manipulates the data stream such that the four convolutionally encoded bits v1, v0, w1 and w0 are properly distributed between the two consecutive tones and concatenated with the remaining data bits for each tone to generate an output bit stream containing y0, v1 and v0 as the three bits for tone 1 and bits y4, y3, y2, y1, w1 and w0 as the six bits for tone 2. As a result, the data bits for the two tones are tied together through the 16-state Wei's convolutional encoder. Next, the bits for tone 1 and tone 2 are shifted out by output shift register 140 for use by constellation mapper 160. Finally, the properly concatenated bits for each tone are mapped into a constellation point to complete the encoding process.

The conventional method, however, is extremely inefficient, complex and time consuming, especially when implemented in hardware. For example, the conventional method requires numerous clock cycles for calculating the required number of bits for each pair of tones. Further, the conventional method requires that bits for tone 1 and tone 2 be received and processed at the same time and that bits be shifted serially one by one, and etc. These and other shortcomings of the conventional method have formed a bottleneck in the downstream direction, i.e., in ADSL transmitters at the central sites, where the number of tones per DMT symbol or frame is very large. As stated above, the number of tones per DMT symbol in the downstream direction is 256, as opposed to 32 tones in the upstream direction, i.e., ADSL transmitters at the client side.

Accordingly, there is an intense need in the art for a new trellis encoding method and system that can eliminate the inefficiencies, complexities and other drawbacks of the conventional methods and that can remove the bottleneck in the downstream direction.

SUMMARY OF THE INVENTION

In accordance with the purpose of the present invention as broadly described herein, there is provided method and system for communications cards.

To describe various aspects of the present invention, a three-stage four-dimensional encoding system and method for DMT-based transceivers is disclosed. In the first stage, a parallel shifter shifts three bits of input data bits from a shadow register into a holding register. Next, a convolutional encoder generates encoded bits v1, v0, w1 and w0, using the three bits in the holding register. The encoded bits w1 and w0 may be registered as w1' and w0' for later use. In the second stage, the encoded bits v1 and v0 are provided to the inputs of the parallel shifter for parallel parsing of bits for the first tone of a pair of tones of DMT and the number of bits needed for the first tone are parallel shifted to the holding register. The bits in the holding register are then mapped by a constellation mapper into a constellation point. In the third stage, the encoded bits w1' and w0' are provided to the inputs of the parallel shifter for parallel parsing of bits for the second tone of the pair of tones and the number of bits needed for the second tone are parallel shifted to the holding register. The bits in the holding register are then mapped by a constellation mapper into a constellation point.

These and other aspects of the present invention will become apparent with further reference to the drawings and specification, which follow.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1b illustrates the operation of shift register of FIG. 1a;

DETAILED DESCRIPTION OF THE INVENTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the ADSL system described herein is merely one illustrative application for the invention. Further, it should be noted that the present invention may employ any number of conventional techniques for data transmission, signaling, signal processing and conditioning, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional modulation techniques, trellis encoding, constellation mapping, convolutional encoding, and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 2:
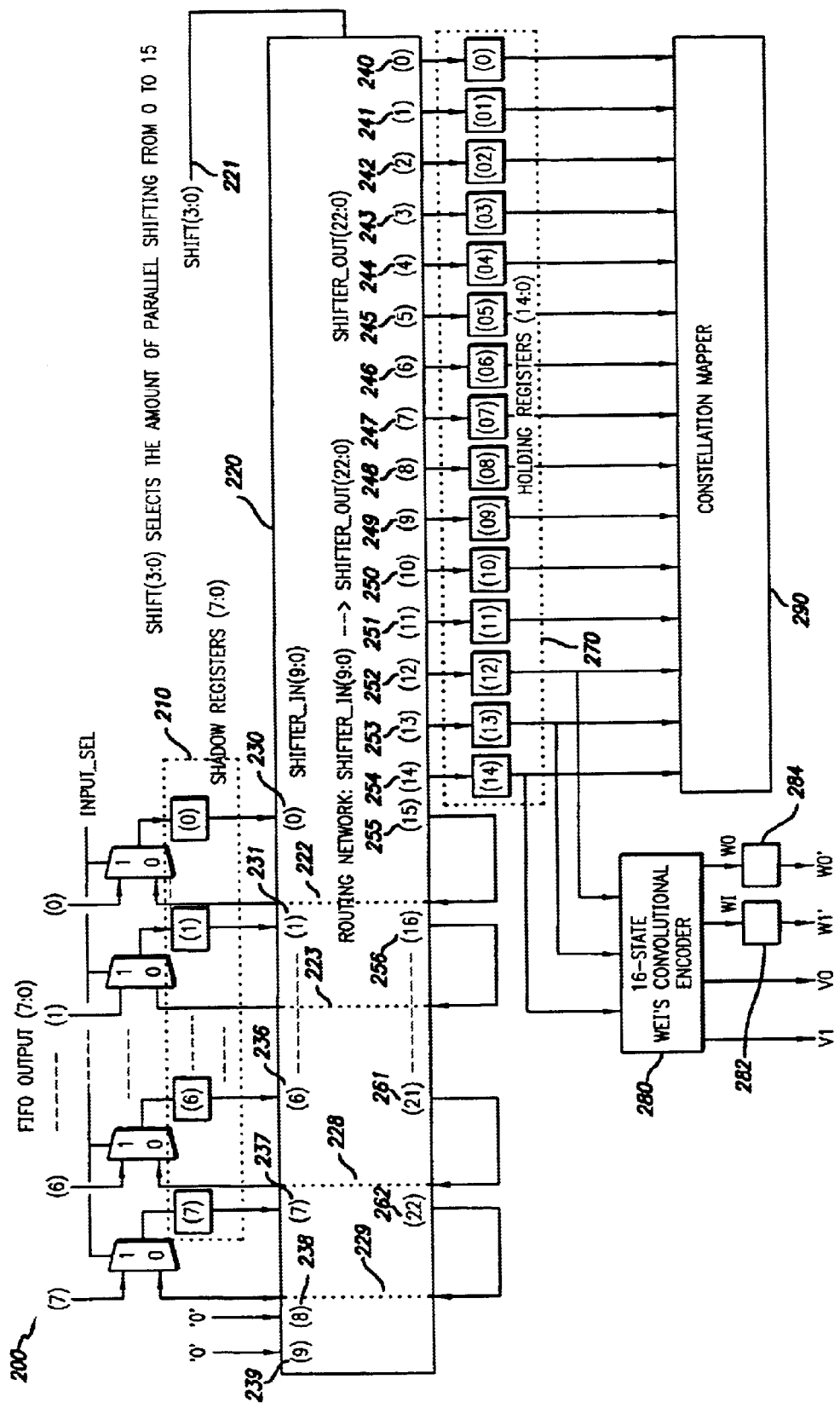
FIG. 2 illustrates a block diagram of a 4-D trellis encoding system for DMT-based transceivers, according to one embodiment of the present invention.

Turning to the drawings, FIG. 2 illustrates a block diagram of 4-D trellis encoding system 200 for DMT-based transceivers. As shown, trellis encoding system 200 includes shadow register 210 for receiving input bit stream from a FIFO (not shown) for parsing among DMT tones, parallel shifter 220 for parallel bit parsing for each DMT tone, holding register 270 for outputting parsed bits, 16-state Wei's convolutional encoder 280 for coding and expanding the constellation by one bit, and constellation mapper 290 for mapping encoded bits into constellation points. Parallel shifter 220 comprises ten shifter inputs 230–239, denoted as shifter$_{13}$ in(9:0) for inputting bits from shadow register 210 and/or convolutional encoder 280, twenty-three shifter outputs 240–262, denoted as shifter_out(22:0) for outputting bits to convolutional encoder 280 and/or constellation mapper 290, shift selector 221 for selecting a number of bits to be shifted by parallel shifter 220 ranging from 0 to 15 bits, denoted as shift(3:0), i.e., a 4-bit number. As shown, shifter outputs 240–254 are loaded into holding register 270 while shifter outputs 255–262 are fed back into shadow register 210 through interconnects 222–229, shown as dotted lines.

In addition to the FIFO, which stores the input bit stream for each tone, trellis encoding system 200 further includes two other memory structures (not shown), an NB/TI memory for storing number of bits and tone index and an EB memory for storing encoded bits. The NB/TI memory may be a 256-word RAM or 256 entries of 14 bits which are arranged in tone-ordered fashion, where the first four bits 0–3 include the number of bits in each tone which may be 0–15 bits, the second eight bits 4–11 include the tone index which may range from 0 to 255 for a central site ADSL modem, and the remaining bits 12–13 are used for tone monitoring and other maintenance functions. The EB memory may be a 256-word RAM for storing encoded bits that may range from 0 to 15 bits per tone.

Figure 3:
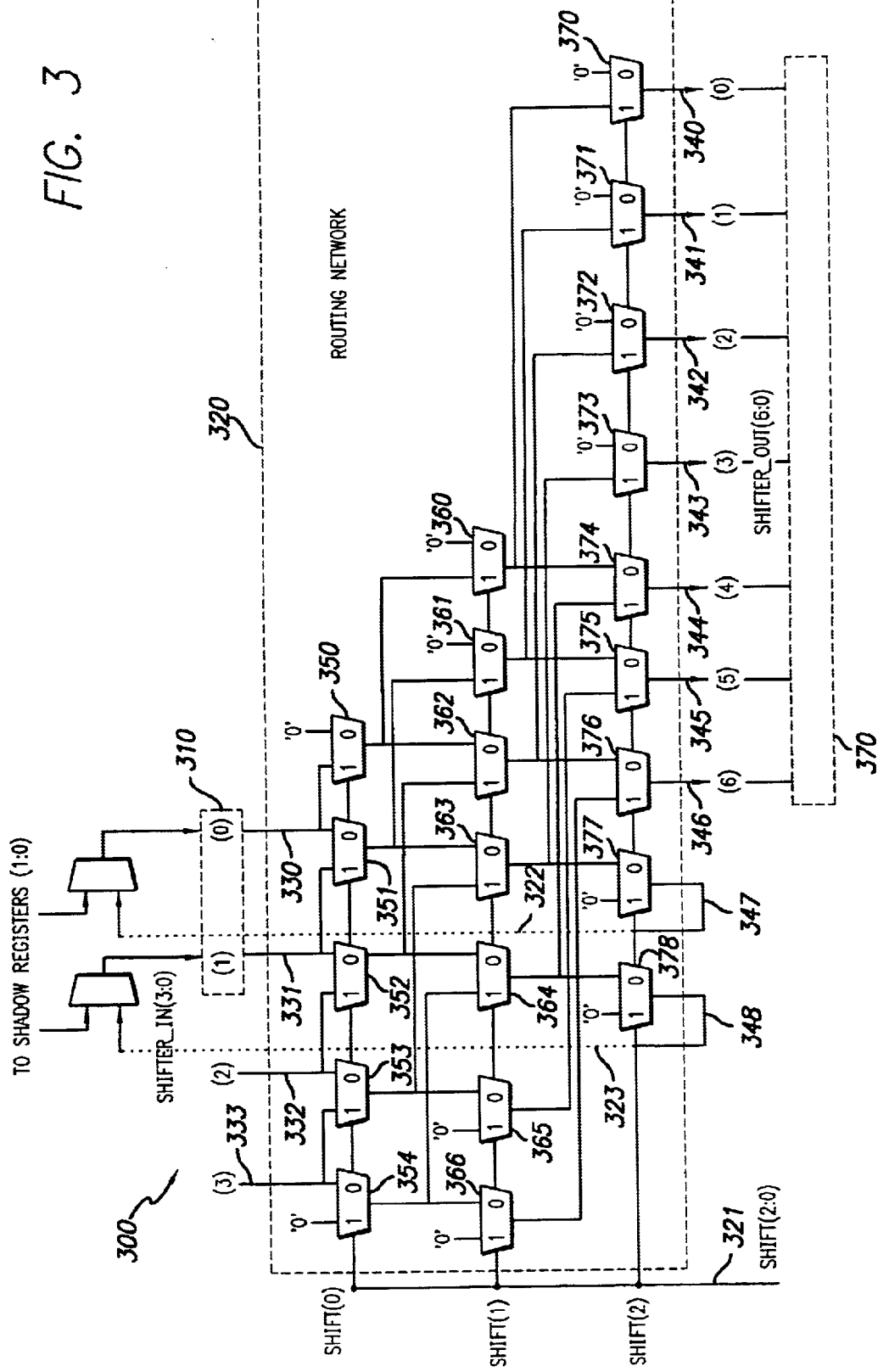
FIG. 3 illustrates an internal block diagram of a parallel shifter of FIG. 2.

FIG. 3 illustrates an internal block diagram of parallel shifter 320 according to one embodiment of the present invention. Parallel shifter 320 is similar to parallel shifter 220 of FIG. 2 in terms of functions, but parallel shifter 320 includes less of number of inputs, outputs and shift selector range than those of parallel shifter 220. As shown, parallel shifter 320 includes four shifter inputs 330–333 for inputting bits from two-bit shadow register 310, nine shifter outputs 340–348 and shift selector 321 for selecting a number of bits to be shifted by parallel shifter 320 ranging from 0 to 7 bits, denoted as shift(2:0), i.e., a 3-bit number. As shown, shifter outputs 340–346 are loaded into holding register, 370 while shifter outputs 347–348 are fed back into shadow register 310 through interconnects 322–323, shown as dotted lines.

As further shown in FIG. 3, parallel shifter 320 includes a plurality of two-input multiplexers 350–354, 360–366 and 370–378. As shown, shifter inputs 330–334 are each connected to two inputs of multiplexers 350–353. For example, shifter input 330 is connected to input "1" of multiplexer of 350 and input "0" of multiplexer 351, and shifter input 331 is connected to input "1" of multiplexer of 351 and input "0" of multiplexer 352, and so on. Any free input of any multiplexer is connected to "0". Output of each multiplexer 350–354 is further an input to two of multiplexers 360–366. For example, output of multiplexer 350 is an input to multiplexer 360 and multiplexer 362, output of multiplexer 351 is an input to multiplexer 361 and multiplexer 363, and so forth. Similarly, output of each multiplexer 360–366 is further an input to two of multiplexers 370–378. For example, output of multiplexer 360 is an input to multiplexer 370 and multiplexer 374, output of multiplexer 361 is an input to multiplexer 371 and multiplexer 375, and so forth. Outputs of multiplexers 370–378 correspond to shifter outputs 340–348, respectively. As shown, shifter outputs 340–346 are provided to holding register 370 and shifter outputs 347–348 are fed back into shadow register 310.

Figure 1A:
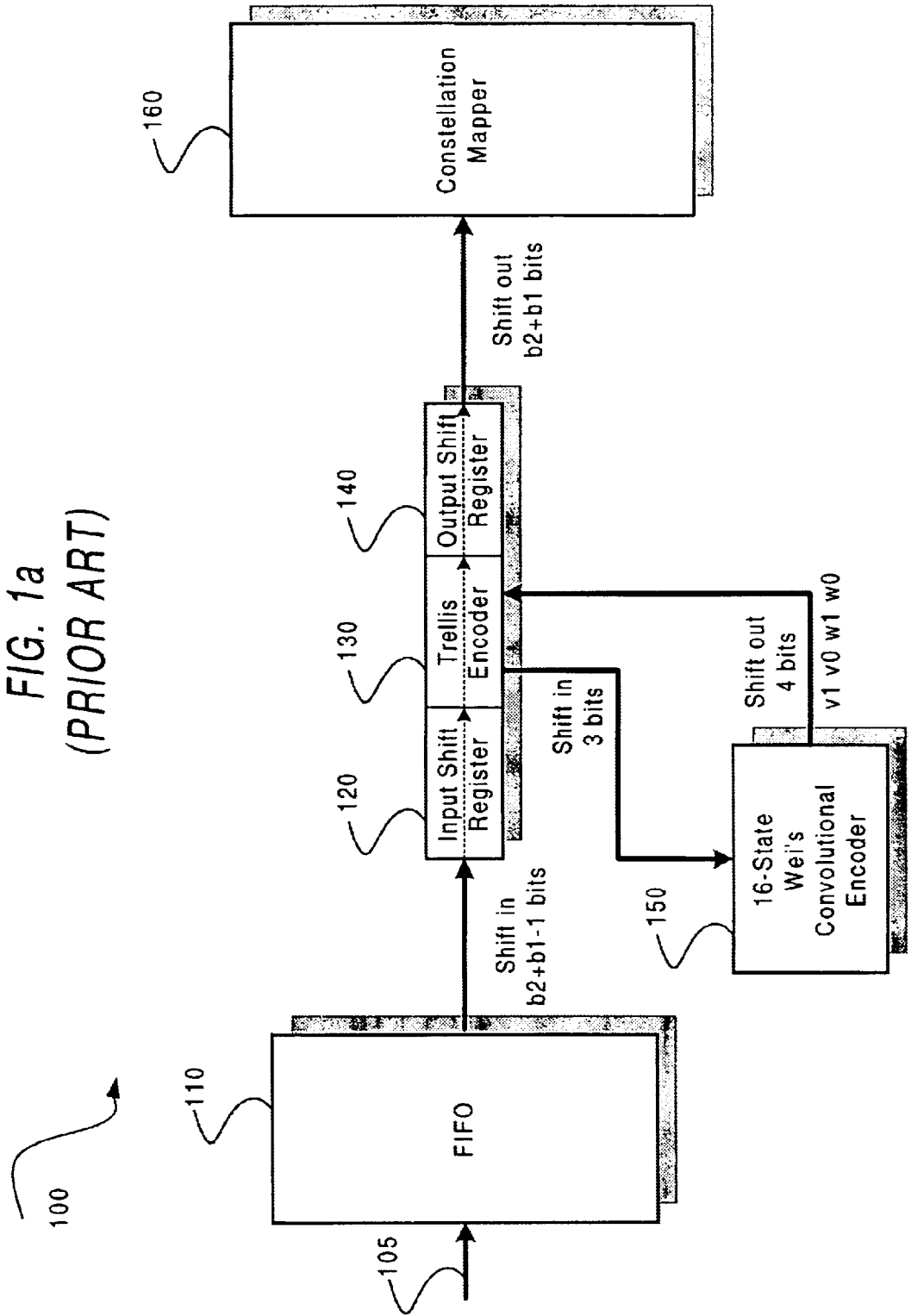
FIG. 1a illustrates a conventional modulation and encoding system.
Figure 1B:
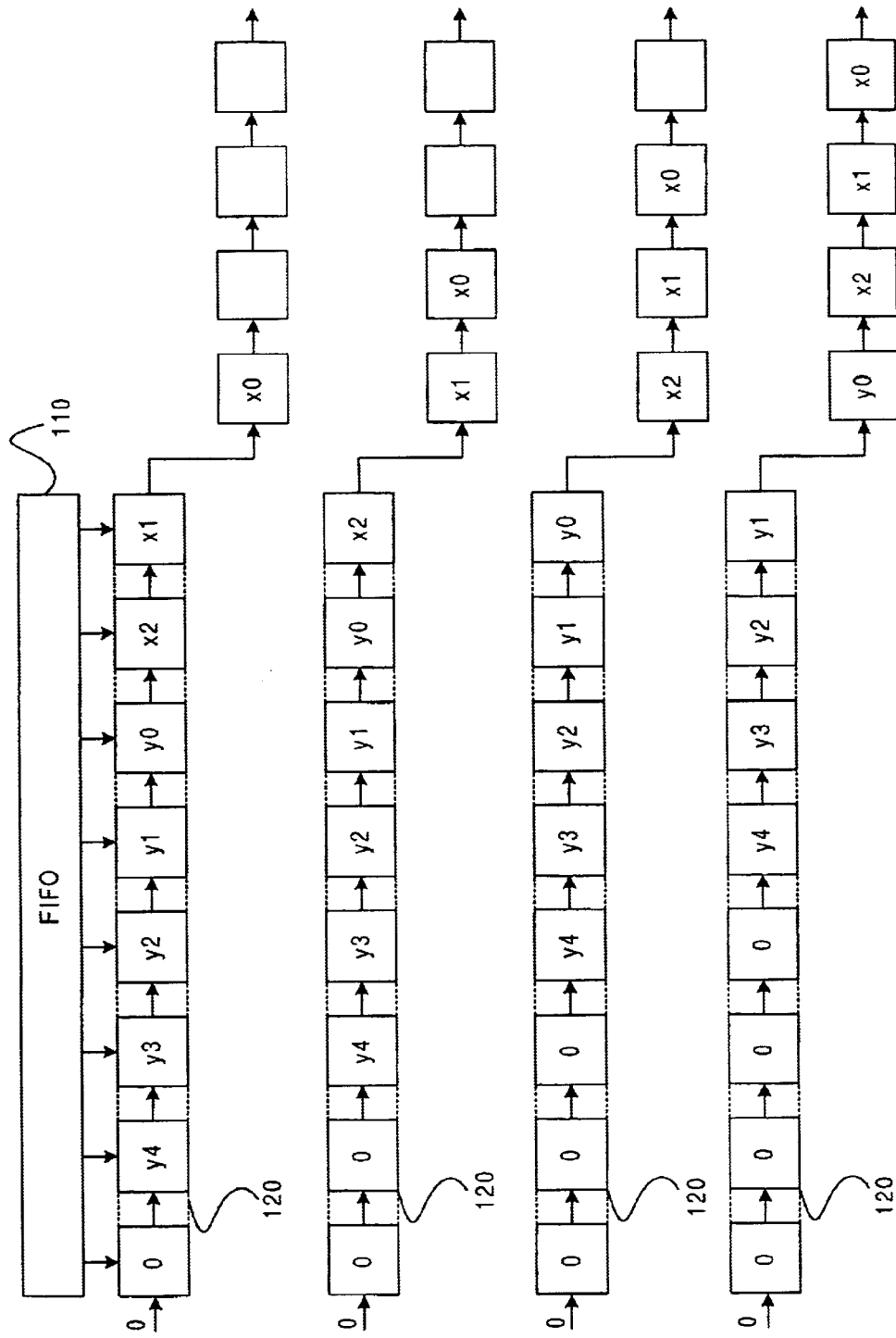

The least significant bit or shift(0) of shift selector 321 acts as an input selector for multiplexers 350–354. In other words, when the least significant bit of shift selector 321 is set to "1", shifter inputs 330–333 are routed through inputs "1" of multiplexers 350–353 and when set to "0", shifter inputs 330–333 are routed through inputs "0" of multiplexers 351–354. As further shown, shift(1) of shift selector 321 acts as an input selector for multiplexers 360–366 and the most significant bit or shift(2) of selector 321 acts as an input selector for multiplexers 370–378. For example, to parallel shift three bits, i.e., bits at shifter input bits 330–332 into shifter outputs 344–346, shift selector 321 is set to "3" or "011", i.e., shift(0)=1, shift(1)=1 and shift(2)=0. As a result, input "1" of multiplexers 350–354, input "1" of multiplexers 360–366 and input "0" of multiplexers of 370–378 are selected. For example, shifter input 330 is transferred from multiplexer 350, through multiplexer 360, through multiplexer 374 to shifter output 344. Shifter input 331 is transferred from multiplexer 351, through multiplexer 361, through multiplexer 375 to shifter output 345. Shifter input 332 is transferred from multiplexer 352, through multiplexer 362, through multiplexer 376 to shifter output 346. Shifter input 333 is transferred from multiplexer 353, through multiplexer 363, through multiplexer 377, through shifter output 347 and interconnect 322 back to the least significant bit of shadow register 310. As a result, parallel shifting of three bits may be accomplished in one clock cycle compared to one clock cycle per shift or three clock cycles based on conventional serial shifting of FIG. 1b.

Figure 4:
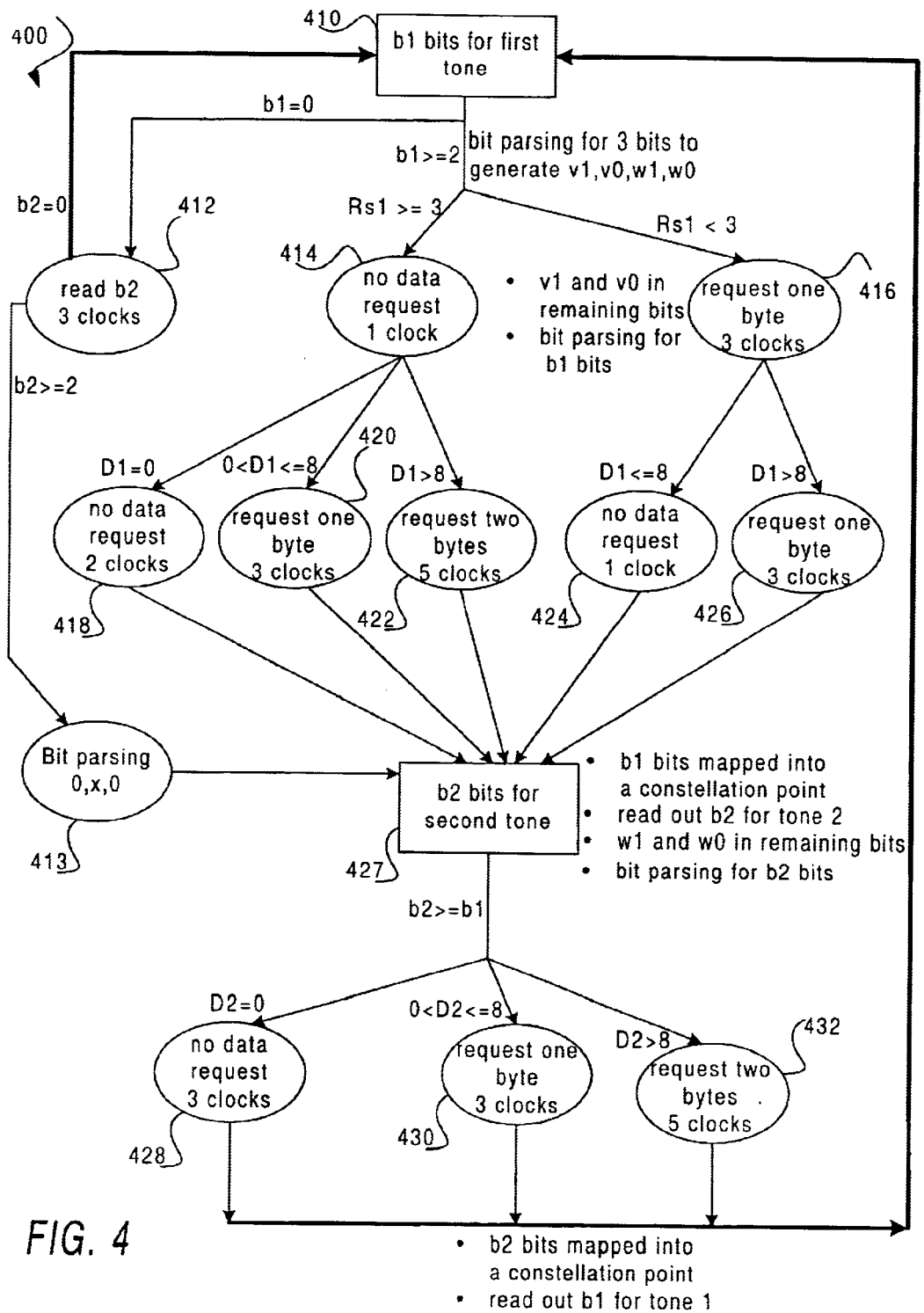
FIG. 4 illustrates a trellis encoding algorithm, according to one embodiment of the present invention.

FIG. 4 illustrates trellis encoding algorithm 400 according to one embodiment of the present invention. 4-D trellis encoding is performed on every two consecutive tones or a pair of consecutive tones. For purposes of describing the trellis encoding process, t1 denotes the first tone of a pair of tones, b1 denotes the number of bits in t1, t2 denotes the second tone of the pair of tone and b2 denotes the number of bits in t2. As stated above, b2≧b1 is a requirement of tone ordering algorithm according to the ADSL standard. Further, neither b1 nor b2 may include only one bit. Trellis encoding algorithm 400 begins at initial state 410. In initial state 410, the number of bits for the first tone or b1 is read from the NB/TI memory. If b1 is zero, trellis encoding algorithm 400 moves to state 412 and reads the number of bits for the second tone or b2. If b2 is also zero, trellis encoding algorithm 400 moves back to state 410. Accordingly, for any pair of tones where b1=b2=0, no data is extracted from the FIFO and the real and imaginary outputs of the trellis encoding algorithm 400 will be set to zero for such tones. In one embodiment, processing tones with zero bits takes three clock cycles. The three cycles are used to initiate bit parsing for the next tone or reading the number of bits in the next tone from the NB/TI memory.

The trellis encoding begins once a tone with data bits is encountered in state 410 or state 412, i.e., b1≧2 or b2≧2. Trellis encoding algorithm 400 either transitions from state 410 to one of states 414 or 416 if b1≧2 is encountered first, to process t1, or transitions from state 412 to one of states 413 if b2≧2 is encountered first. It should be noted that either t1 or t2 may carry 0 to 15 bits, i.e., 0≦b1≦15 and 0≦b2≦15. Accordingly, zero to two eight-bit bytes of data may be requested from the FIFO, which bits are read out of the FIFO and written into eight-bit shadow register 210 (FIG. 2) for bit parsing purposes.

In one embodiment, the first tone (t1) and the second tone (t2) are de-coupled and processed separately to speed up the trellis encoding process. In other words, the trellis encoding process is performed on a tone by tone basis. In one embodiment, the trellis encoding process for each tone pair that carries non-zero data bits may be performed in three stages, as described below with reference to FIGS. 2 and 4.

In the first stage of trellis encoding algorithm 400, three data bits are shifted in parallel from the three least significant bits (2:0) of shadow register 210 into three most significant bits (14:12) of holding register 270. The three parsed data bits are then fed into convolutional encoder 280 to generate v1, v0, w1 and w0. The last two bits, w1 and w0 are then placed in temporary registers 282 and 284, respectively, to be used at a later time and will be denoted as w1' and w0', respectively.

If b1≧2, trellis encoding algorithm 400 transitions to state 414 if the remaining number of bits in shadow register 210, denoted as Rs1, is greater than three data bits. Accordingly, the first stage of the encoding process may be performed without requiring additional bits from the FIFO. In this case, with a single parallel shift, taking one clock cycle, three data bits are shifted in parallel from the three least significant bits (2:0) of shadow register 210 into the three most significant bits (14:12) of holding register 270 to generate v1, v0, w1 and w0 using convolutional encoder 280. On the other hand, if the remaining number of bits in shadow register 210 or Rs1 is less than three data bits, trellis encoding algorithm 400 transitions to state 416 and an eight-bit byte is read from the FIFO, which requires three clock cycles. Prior to writing the eight bits of data into shadow register 210, if Rs1 is not zero, a parallel shift is performed to move the three least significant bits (2:0) of shadow register 210 into the three most significant bits (14:12) of holding register 270. Next, after receiving the eight bits of data by shadow register 210, a parallel shift is performed to shift 3-Rs1 bits from shadow register 210 to holding register 270. In other words, if Rs1=0, (3-Rs1=3), a parallel shift is performed to move the three least significant bits (2:0) of shadow register 210 into the three most significant bits (14:12) of holding register 270; if Rs1=1, (3-Rs1=2), a parallel shift is performed to move the two least significant bits (1:0) of shadow register 210 into the two most significant bits (14:13) of holding register 270; and if Rs1=2, (3-Rs1=1), a parallel shift is performed to move the least significant bit (0) of shadow register 210 into the most significant bit (14) of holding register 270. Next, as part of the first stage, the three most significant bits (14:12) of holding register 270 are fed into convolutional encoder 280 to generate v1, v0, w1 and w0.

Now, if b1=0 and b2≧2, trellis encoding algorithm 400 transitions from state 410 to state 412 and from there to state. 413, where based on the ADSL standard, the three bits "0", "X" and "0" are fed into convolutional encoder 280 to generate v1, v0, w1 and w0, where X is the data bit at shifter input 230. In this case, no data is requested from the FIFO and one parallel shift is performed to move data bits "0", "X" and "0" to holding register 270.

The number of parallel shifting by parallel shifter 220 (FIG. 2) depends upon the number of bytes that are read from the FIFO. For example, if no data is requested from the FIFO, one parallel shift is required to shift b1 bits. If one byte of data is requested, then one parallel shift is used to shift b1 bits and a second parallel shift is used to shift b1 minus remaining bits. However, if two bytes of data are requested, then a first parallel shift is used to shift b1 bits, a second to shift b1 minus remaining bits Rs1 and a third to shift b1-8 minus remaining bits.

Figure 5A:
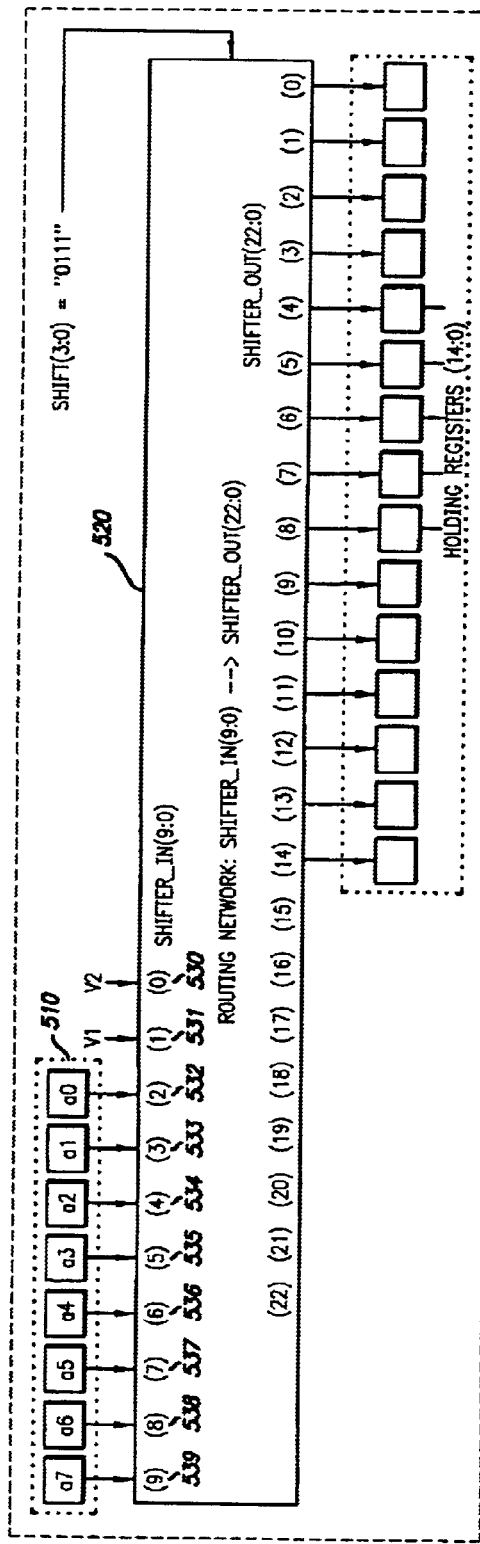
FIG. 5a illustrates use of a parallel shifter to shift encoded bits.

In the second stage of trellis encoding algorithm 400, data bits from the FIFO and those generated in the first stage are properly concatenated to generate b1 bits for t1. To this end, v1 and v0 are included in the remaining bits for t1 by routing v1 and v0 to shifter inputs 231–230 and routing shadow register 210 to shifter inputs 232–239 for parallel parsing of b1 bits for t1. FIG. 5a illustrates an example parallel shifter 520, where v1 and v0 are routed to shifter inputs 531 and 530, respectively, and shadow register 510 is routed to shifter inputs 532–539.

The remaining number of bits for bit parsing, denoted as Rs1', should be calculated. In state 414, where no data is requested from the FIFO, the remaining number of bits for bit parsing is equal to the remaining number of bits in shadow register 210 minus the number of bits shifted (three bits for generating v1,v0,w1,w0) plus two bits (v1,v0). In other words, Rs1'=Rs1−3+2. On the other hand, in state 416, where one byte of data is requested from the FIFO, the remaining number of bits for bit parsing is equal to the remaining number of bits in shadow register 210 minus the number of shifted (three bits for generating v1,v0,w1,w0) plus eight bits of new data and two bits (v1,v0). In other words, Rs1'=Rs1−3+8+2.

Figure 5B:
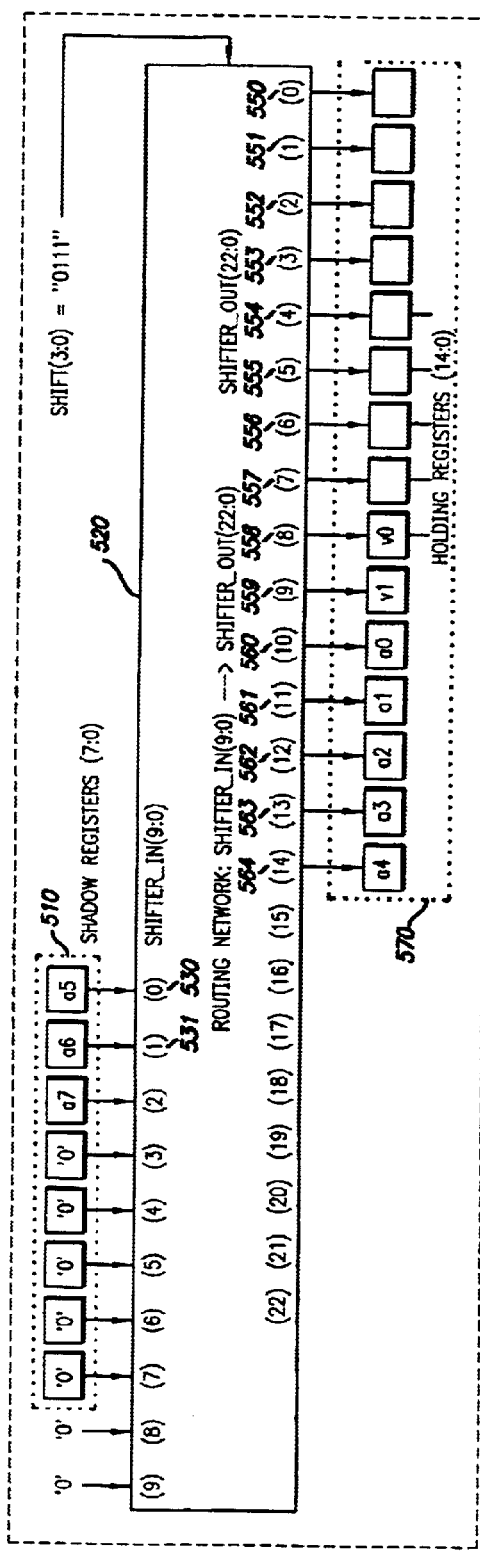
FIG. 5b illustrates shifted encoded bits using the parallel shifter of FIG. 5b.

At this juncture, whether trellis encoding algorithm 400 is in state 414 or state 416, the difference, denoted as D1, between the remaining number of bits for parsing or Rs1', and the number of bits in t1 or b1, must be calculated to determine the number of data bytes needed from the FIFO to complete bit parsing for t1. D1 is calculated as follows: if Rs1'≧b1, then D1=0, else D1=b1−Rs1'. Now, if trellis encoding algorithm 400 is in state 414, depending upon the value of D1, trellis encoding algorithm 400 transitions to one of states 418, 420 or 422. As shown in FIG. 4, if D1=0, trellis encoding algorithm 400 transitions to state 418 and no data byte is requested from the FIFO, which requires two clock cycles; if 0<D1≦8, trellis encoding algorithm 400 transitions to state 420 and one data byte is requested from the FIFO, which requires three clock cycles; and if D1>8, trellis encoding algorithm 400 transitions to state 422 and two data bytes are requested from the FIFO, which requires five clock cycles. However, if trellis encoding algorithm 400 is in state 416, depending upon the value of D1, trellis encoding algorithm 400 transitions to one of states 424 or 426. As shown in FIG. 4, if 0<D1≦8, trellis encoding algorithm 400 transitions to state 424 and no data byte is requested from the FIFO, which requires one clock cycles; and if D1>8, trellis encoding algorithm 400 transitions to state 426 and one data byte is requested from the FIFO, which requires three clock cycles. FIG. 5a illustrates an example according to state transition 414–420, where b1=7, Rs1=3 and a byte of data having bits a0–a7 is requested from the FIFO and placed in shadow register 510. The remaining number of bits for bit parsing may be calculated as follows: Rs1'=3−3+2=2. Applying the above-mentioned formula for calculating D1:if Rs1'≧b1, then D1=0, else D1=b1−Rs1', i.e., D1=7−2=5. Therefore, trellis encoding algorithm 400 transitions to state 420, where no data byte is requested from the FIFO. Furthermore, the number of parallel shifting by parallel shifter 220 (FIG. 2), in the second stage, depends upon the number of bytes that are read from the FIFO, as described above in conjunction with the first stage. As shown in FIG. 5b, after parallel shifting seven bits (v1, v0, a0, a1, a2, a3, a4) from shadow register 510 to holding register 570, three bits (a5, a6, a7) remain in shadow register 510 for b2 bits parsing of t2.

The first two stages of trellis encoding algorithm 400 complete the trellis encoding process for t1. At this point, trellis encoding algorithm 400 reaches states 427, where b1 bits, including v1 and v0, are mapped into a constellation point, and w1 and w0 have remained in the remaining bits for b2 bits parsing. Accordingly, mapping of b1 bits are performed by constellation mapper 290 after concatenating v1 and v0 with other b1 bits and parallel shifting from shadow register 210 to holding register 270 and from there to constellation mapper 290, without using any additional registers for concatenation purposes. As shown in FIG. 4 and Table 1 below, the number of clock cycles for b1 bits parsing varies depending upon the values of D1 and ranges from 3 to 6 clocks cycles.

TABLE 1

Clock Cycles for Parsing Tone 1

| Value of D1 | State Transitions | Clock cycles |
|---|---|---|
| D1 = 0 | 414 → 418 | 3 |
| 0 < D1 <= 8 | 414 → 420 | 4 |
|  | 416 → 424 | 4 |
| D1 > 8 | 414 → 422 | 6 |
|  | 416 → 426 | 6 |

Further, in one embodiment, b2 bits for tone 2 may be read from the FIFO prior to reaching state 427 in order to speed up trellis encoding algorithm 400.

Figure 6A:
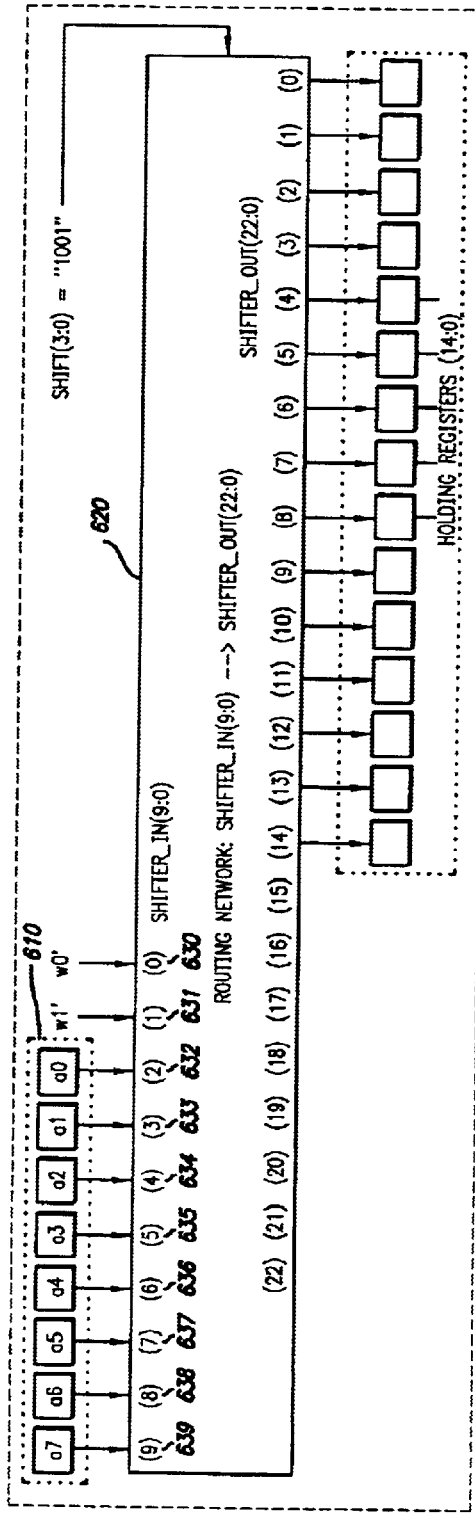
FIG. 6a illustrates use of a parallel shifter to shift encoded bits.

Now, in the third stage of trellis encoding algorithm 400, w1' and w0' (the outputs of temporary registers 282 and 284 storing w1 and w0, respectively) are included in the remaining bits by being fed into shifter inputs 231 and 230 of parallel shifter 220, respectively. FIG. 6a illustrates an example parallel shifter 620, where w1' and w0' are routed to shifter inputs 631 and 630, respectively, and shadow register 610 is routed to shifter inputs 632–639. At this point, the new value of remaining bits, denoted as Rs2', in shadow register 210 for b2 bits parsing should be calculated based on the old value of the remaining bits or Rs1'=Rs2, the number of t1 bits or b1 and the two bits from convolutional encoder 280, namely w1' and w0', as shown in Table 2 below.

TABLE 2

Remaining bits for parsing b2 bits

| Number of bytes requested from the FIFO | State Transitions | Rs2' |
|---|---|---|
| 0 | 414 → 418 → 427 | Rs1' – b1 + 2 |
| 1 | 414 → 420 → 427 | Rs1' – b1 + 8 + 2 |
|  | 416 → 424 → 427 | Rs1' – b1 + 8 + 2 |
| 2 | 414 → 422 → 427 | Rs1' – b1 + 16 + 2 |
|  | 416 → 426 → 427 | Rs1' – b1 + 16 + 2 |

Figure 6B:
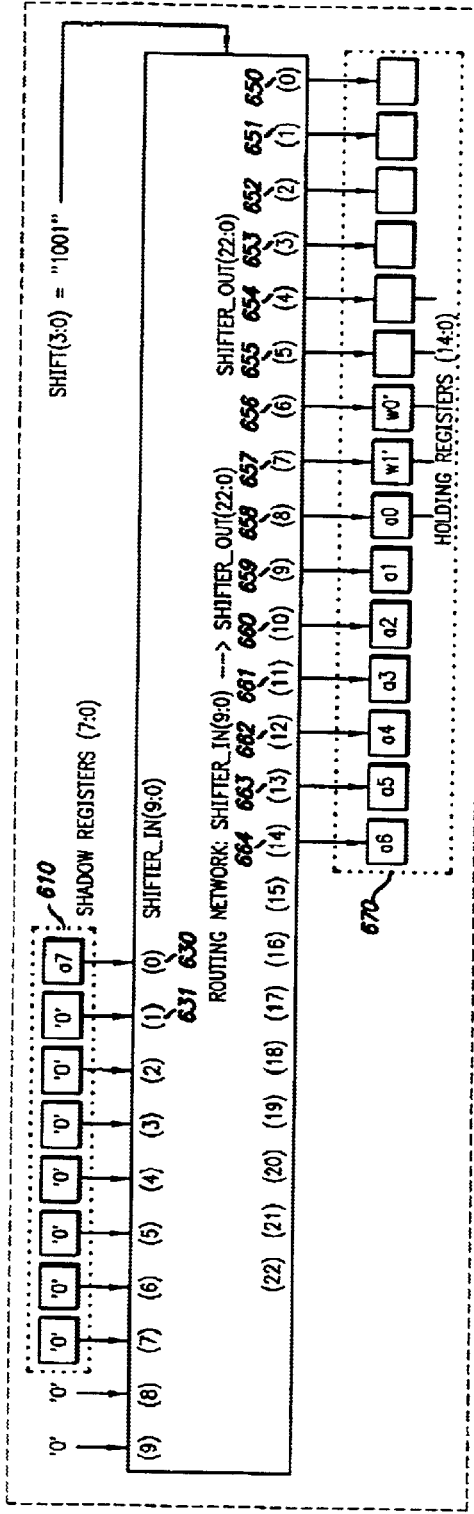
FIG. 6b illustrates shifted encoded bits using the parallel shifter of FIG. 6b.

Next, the difference, denoted as D2, between the remaining number of bits for parsing or Rs2' and the number of bits in t2 or b2, must be calculated to determine the number of data bytes needed from the FIFO to complete bit parsing for t2. D2 is calculated as follows: if Rs2'≧b2, then D2=0, else D2=b2−Rs2'. Now, from state 427, depending upon the value of D2, trellis encoding algorithm 400 transitions to one of states 428, 430 or 432. As shown in FIG. 4, if D2=0, trellis encoding algorithm 400 transitions to state 428 and no data byte is requested from the FIFO, which requires three clock cycles; if 0<D2≦8, trellis encoding algorithm 400 transitions to state 430 and one data byte is requested from the FIFO, which requires three clock cycles; and if D2>8, trellis encoding algorithm 400 transitions to state 432 and two data bytes are requested from the FIFO, which requires five cycles. Turning to the examples of FIGS. 6a and 6b, bit parsing for b2=9 is illustrated, where Rs2=2, D2=7 and a byte of data having bits a0–a7 is requested from the FIFO in state 430 and placed in shadow register 610. As shown in FIG. 6b, after parallel shifting nine bits (w1', w0', a0, a1, a2, a3, a4, a5, a6) from shadow register 610 to holding register 670, one bit (a7) remains in shadow register 610 for bit parsing of the next first tone.

The number of parallel shifting by parallel shifter 220 (FIG. 2), in the third stage, depends upon the number of bytes that are read from the FIFO, as described above in conjunction with the first stage. In other words, if no data byte is requested (state 428), shift selector 221 is set to b2 for one parallel shift, if one data byte is requested (state 430), shift selector 221 is first set to b2 and then set to b2−Rs2' for two parallel shifts, and if two data bytes are requested (state 432), shift selector 221 is first set to b2, then set to b2 31 Rs2' and then set to b2−Rs2−8 for three parallel shifts.

The third stage of trellis encoding algorithm 400 completes the trellis encoding process for t2. At this point, b2 bits, including w1' and w0', are mapped into a constellation point. Accordingly, mapping of b2 bits are performed by constellation mapper 290 after concatenating w1' and w0' with other b2 bits and parallel shifting from shadow register 210 to holding register 270 and from there to constellation mapper 290, without using any additional registers for concatenation purposes. As shown in FIG. 4 and Table 3 below, the number of clock cycles for b2 bits parsing varies depending upon the values of D2 and ranges from 3 to 5 clocks cycles.

TABLE 3

Clock Cycles for Parsing Tone 2

| Value of D2 | State Transitions | Clock cycles |
|---|---|---|
| D2 = 0 | 427 → 428 | 3 |
| 0 < D2 <= 8 | 427 → 430 | 3 |
| D2 > 8 | 427 → 432 | 5 |

Next, the bit parsing for the tone 1 of the next pair of tones is initiated by reading out b1 bits for t1 of the next pair of tones and calculating the remaining number of bits or Rs1 for bit parsing of the first tone of the next pair of tones. The new value of remaining bits or Rs1 of the next pair of tones in shadow register 210 for b1 bits parsing of the next pair is calculated based on the old value of the remaining bits or Rs2' the number of t2 bits or b2, as shown in Table 4 below. It should be noted that there are no convolutionally encoded bits at this stage.

TABLE 4

Remaining bits for parsing b1 bits of next pair of tones

| Number of bytes requested from the FIFO | State Transitions | Rs1 of next pair |
|---|---|---|
| 0 | 427 → 428 | Rs2' − b2 |
| 1 | 427 → 430 | Rs2' − b2 + 8 |
| 2 | 427 → 432 | Rs2' − b2 + 16 |

Accordingly, trellis encoding algorithm 400 for a pair of tone is completed and information for processing the first tone of the next pair of tones is compiled for use in state 410. As described, trellis encoding algorithm 400 enhances the efficiency and speed by de-coupling each pair of tone and processing each tone separately. Furthermore, parallel shifter 220 enhances the speed and simplifies the process of concatenating the convolutionally encoded bits with the remaining bits. In fact, it should be noted that trellis encoding algorithm 400 eliminates the need for calculating the value of b1+b2−1 for compliance with the standard, since such requirement of the standard is implicitly met by trellis encoding algorithm 400.

Figure 7:
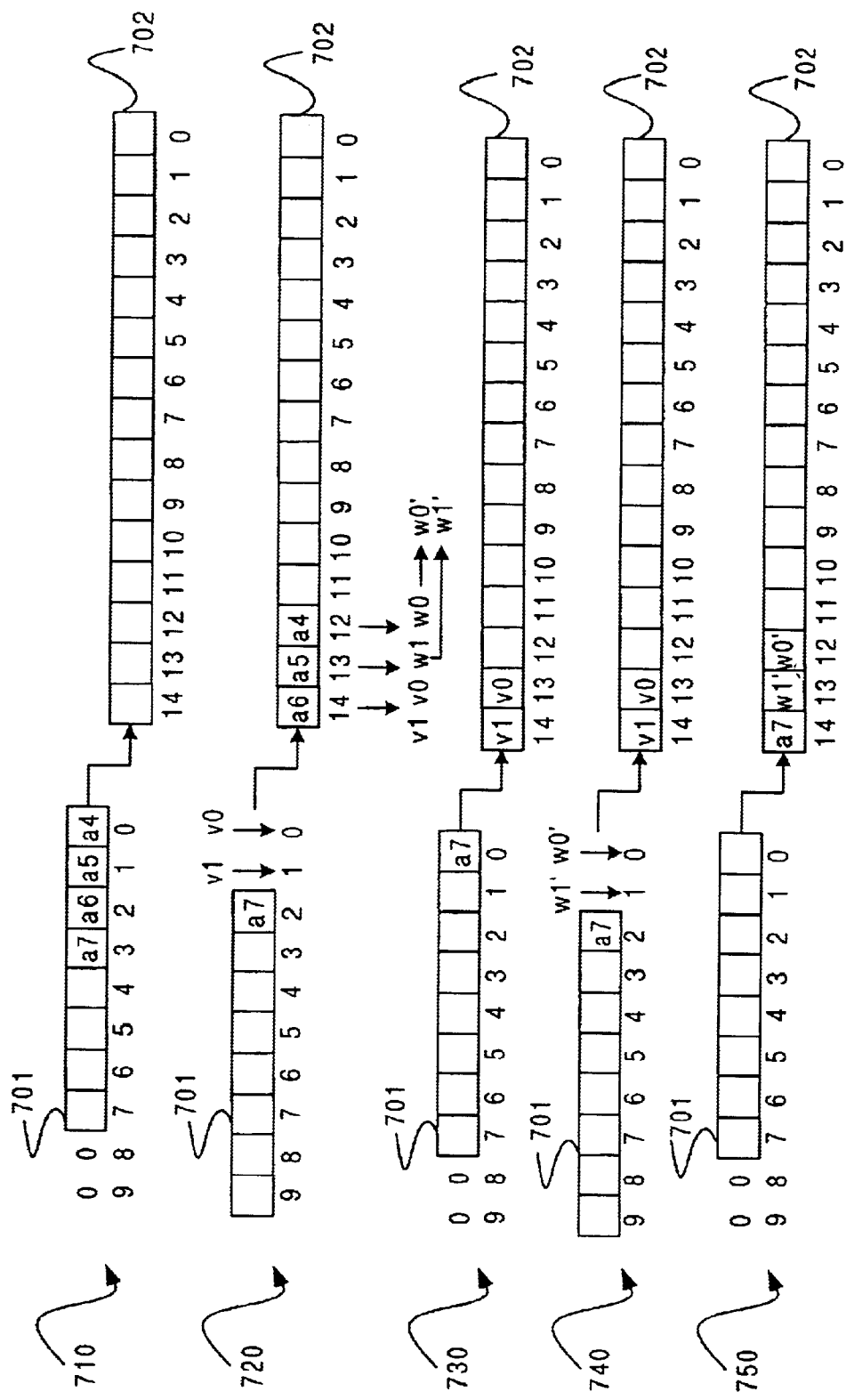
FIG. 7 illustrates an application of the trellis encoding algorithm of FIG. 4.

FIG. 7 is an exemplary application of trellis encoding algorithm, according to one embodiment of the present invention. At the initial stage or state 410 of FIG. 4, b1=2 and there are four remaining bits (a7,a6,a5,a4) in shadow register 701, i.e., Rs1=4, as shown in registers status 710. Trellis encoding algorithm 400 transitions to state 414, since Rs1≧3, and three bits (a6,a5,a4) are parallel shifted from shadow register 701 to holding register 702 for use by convolutional encoder to generate v1,v0,w1,w0 and two convolutionally encoded bits v1 and v0 are provided for concatenation with b1 bits, as shown in registers status 720. At this juncture, the new value of the remaining bits or Rs1' is calculated to be Rs1−3+2, i.e., Rs1'=4−3+2=3. Next, D1 is calculated based on the above-described formula: if Rs1'≧b1, then D1=0, else D1=b1−Rs1', i.e., 3≧2, then D1=0, and trellis encoding algorithm 400 transitions to state 418 and no data byte is requested. At this point, b1 bits or two bits for the first tone, including v1 and v0 of convolutionally encoded bits, are parallel shifted from shadow register 701 to holding register 702, as shown in registers status 730. Next, trellis encoding algorithm 400 transitions to state 427, where b2=3, and two convolutionally encoded bits w1' and w0' are provided for concatenation with b2 bits, as shown in registers status 740, and b1 bits (v1,v0) are mapped into a constellation point. Here, the new value of the remaining bits or Rs2' is calculated to be Rs1'−b1+2, i.e., Rs2'=3−2+2=3. Next, D2 is calculated based on the above-described formula: if Rs2'≧b2, then D2=0, else D2=b2−Rs2', i.e., 3≧3, then D2=0, and trellis encoding algorithm 400 transitions to state 428 and no data byte is requested. At this point, b2 bits or three bits (a7,w1',w0') are parallel shifted from shadow register 701 to holding register 702, as shown in registers status 750, and b2 bits (a7,w1',w0') are mapped into a constellation point.

Figure 8:
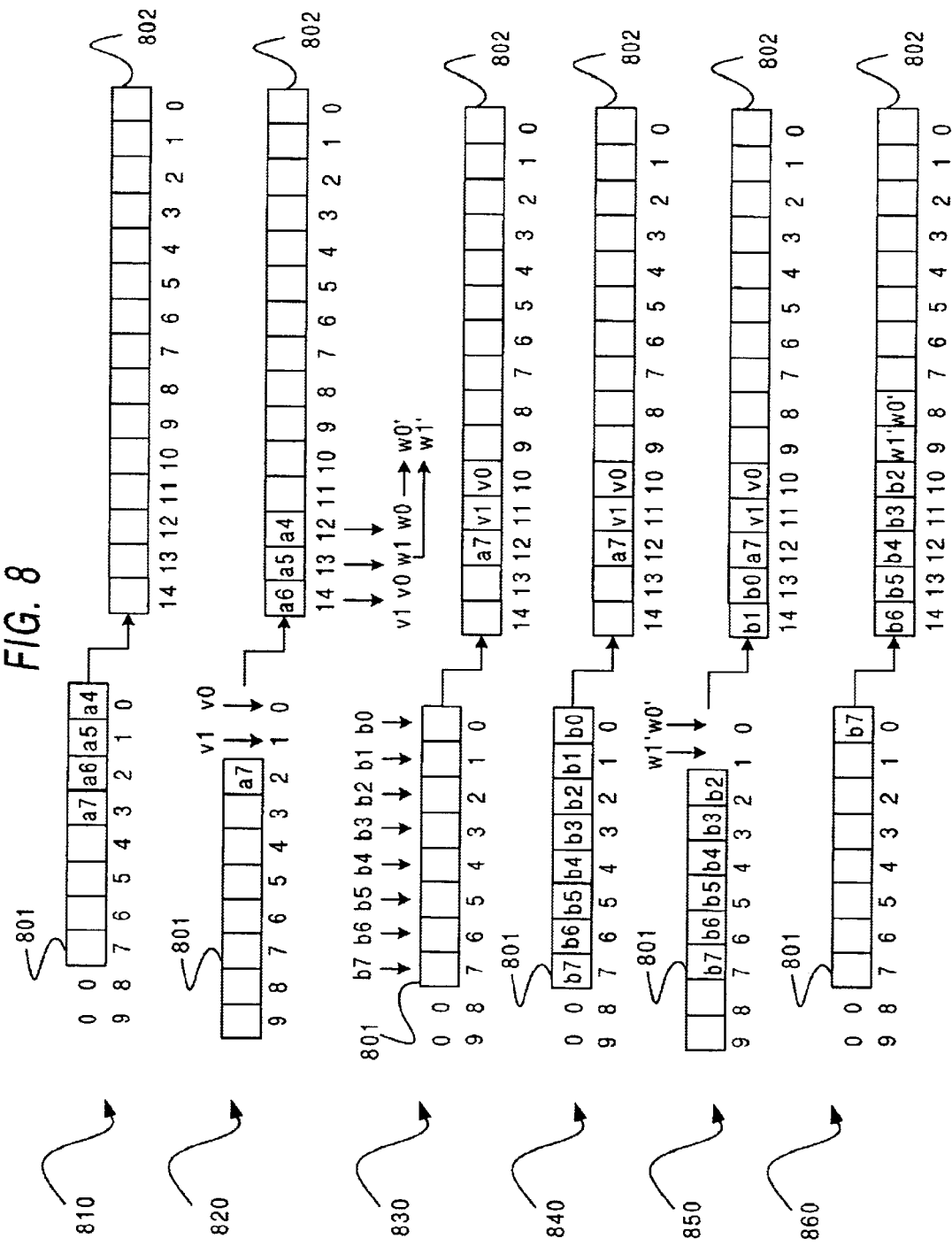
FIG. 8 illustrates an application of the trellis encoding algorithm of FIG. 4.

FIG. 8 is another exemplary application of trellis encoding algorithm, according to one embodiment of the present invention. At the initial stage or state 410 of FIG. 4, b1=5 and there are four remaining bits (a7,a6,a5,a4) in shadow register 801, i.e., Rs1=4, as shown in registers status 810. Trellis encoding algorithm 400 transitions to state 414, since Rs1≧3, and three bits (a6,a5,a4) are parallel shifted from shadow register 801 to holding register 802 for use by convolutional encoder to generate v1,v0,w1,w0 and two convolutionally encoded bits v1 and v0 are provided for concatenation with b1 bits, as shown in registers status 820. At this juncture, the new value of remaining bits or Rs1' is calculated to be Rs1−3+2, i.e., Rs1'=4−3+2=3. Next, D1 is calculated based on the above-described formula: if Rs1'≧b1, then D1=0, else D1=b1−Rs1', i.e., 3≧5, as a result, D1=5−3=2, and trellis encoding algorithm 400 transitions to state 420 and one data byte is requested. At this point, b1 bits or five bits are selected by the shift selector and five bits are parallel shifted from shadow register 801 to holding register 802, such that bits a7, v1 and v0 occupy bit locations 12, 11 and 10 of holding register 802, respectively, as shown in registers status 830. Next, the new data byte (b7–b0) is placed in shadow register 801, as shown in registers status 840. At this point, trellis encoding algorithm 400 transitions to state 427, where b2=7, and two convolutionally encoded bits w1' and w0' are provided for concatenation with b2 bits. Here, a second parallel shift is performed and two bits (b1−3=5−3=2) are selected by the shift selector and two bits are parallel shifted from shadow register 801 to holding register 802, such that bits b1 and b0 occupy bit locations 14 and 13 of holding register 802, respectively, as shown in registers status 850, and b1 bits (b1,b0,a7,v1,v0) are mapped into a constellation point. Next, the new value of remaining bits or Rs2' is calculated to be Rs1−b1+8+2, i.e., Rs2'=3−5+8+2=8. Next, D2 is calculated based on the above-described formula: if Rs2'≧b2, then D2=0, else D2=b2−Rs2', i.e., 8≧7, then D2=0, and trellis encoding algorithm 400 transitions to state 428 and no data byte is requested. At this point, b2 bits or seven bits (b6,b5,b4,b3,b2,w1',w0') are parallel shifted from shadow register 801 to holding register 802, as shown in registers status 860, and b2 bits (b6,b5,b4,b3,b2,w1',w0') are mapped into a constellation point. Next, the remaining bits for the first tone of the next pair may be calculated, i.e., Rs1=Rs2'−b2=8−7=1, which is bit b7 in shadow register 801, as shown in registers status 860.

Various embodiments of the present invention may be implemented in software. When implemented in software, at least some elements of the present invention can be in the form of computer data, including, but not limited to, any bits of information, code, etc. The data may be arranged in group of bits or data segments and may be stored in a processor readable medium or transmitted by a data signal embodied in a carrier wave over a transmission medium or communication link. For example, bits of information in a first tone and a second tone may form various data segments that can be transmitted by a data signal embodied in a carrier wave. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An encoding system for encoding data bits, said system comprising:
   a first register having a plurality of first register inputs and a plurality of first register outputs;
   a second register having a plurality of second register inputs and a plurality of second register outputs;
   a parallel shifter having a plurality of parallel shifter inputs and a plurality of parallel shifter outputs; and an encoder;
wherein said data bits are received by said first register inputs, a plurality of said data bits are parallel shifted from said first register outputs through said parallel shifter inputs and said parallel shifter outputs to said second register inputs for use by said encoder.

2. The system of claim 1, wherein said encoder has a plurality of encoder inputs, and said plurality of said data bits are provided by said parallel shifter outputs to said encoder inputs.

3. The system of claim 2, wherein said encoder has a plurality of encoder outputs, and encoded data generated by said encoder are provided to parallel shifter inputs through said encoder outputs.

4. The system of claim 1 further comprising a constellation mapper having a plurality of constellation mapper inputs, wherein said second memory outputs are in communication with a plurality of constellation mapper inputs.

5. The system of claim 1, wherein said encoder is a convolutional encoder.

6. A four-dimensional trellis encoding method for encoding a first number of bits (b1) in a first tone and a second number of bits (b2) in a second tone, said method comprising the steps of:
moving Rs1 bits of data bits from a first register to a second register if Rs1 is less than three, wherein Rs1 is a number of remaining data bits in said first register;
receiving one or more bits of data bits by said first register after said moving step;
moving (Rs1−3) bits of said data bits from said first register to a said second register after said receiving step;
generating four convolutionally encoded bits designated by v1,v0,w1,w0 using said data bits in said second register;
receiving one or more bits of said data bits by said first register if D1 is greater than eight, wherein D1 is zero if Rs1' is greater or equal to b1, else D1 is b1−Rs1', wherein Rs1' is equal to (Rs1−3+8+2); and
parallel shifting b1 bits to said second register, wherein said b1 bits include v1, v0 and if said b1 bits are greater than two, said b1 bits further include one or more of said data bits in said first register.

7. The method of claim 6, wherein said receiving steps receive eight bits of said data bits at a time.

8. The method claim 6, wherein said first register is an eight-bit register.

9. The method of claim 6, wherein said second register is a fifteen-bit register.

10. The method of claim 6, wherein said moving is performed by a parallel shifter having ten inputs and twenty-three outputs.

11. A method of encoding data bits to generate final bits, said method comprising the steps of:
receiving a number of first bits of said data bits by a first memory if a number of remaining data bits in said first memory is less than three;
parallel shifting a number of second bits of said data bits from said first memory to a second memory;
generating a number of encoded bits using said second bits;
receiving a number of third bits of said data bits by said first memory based on said number of remaining bits, said number of first bits, said number of second bits, a number of final bits and said number of encoded bits for generating said final bits; and
parallel shifting said final bits to said second memory, wherein said final bits include a portion of said encoded bits and if said final bits are greater than said portion of said encoded bits, said final bits further include one or more of said data bits in said first memory.

12. The method of claim 11, wherein said receiving steps receive a number of bits at a time.

13. The method claim 11, wherein said first memory and said second memory are registers.

14. The method of claim 13, wherein said parallel shifting is performed by a parallel shifter in communication with said registers.

15. A trellis encoding method for DMT-based transceivers, said method comprising:
a first stage including the steps of:
receiving, in a register, first bits for a first tone of a pair of tones;
encoding said first bits to generate first encoded bits;
mapping said first encoded bits into a first constellation point;
a second stage performed after said first stage, said second stage including the steps of:
receiving in said register, second bits for a second tone of said pair of tones;
encoding said second bits to generate second encoded bits; and
mapping said second encoded bits into a second constellation point.

16. An encoding system for encoding data bits, said system comprising:
a first memory having a plurality of first memory inputs and a plurality of first memory outputs;
a second memory having a plurality of second memory inputs and a plurality of second memory outputs;
a parallel shifter having a plurality of parallel shifter inputs and a plurality of parallel shifter outputs; and
an encoder having a plurality of encoder inputs and a plurality of encoder outputs;
wherein said data bits are received by said first memory inputs, a plurality of said data bits are parallel shifted from said first memory outputs through said parallel shifter inputs and said parallel shifter outputs to said second memory inputs for use by said encoder, and wherein said plurality of said data bits are provided by said parallel shifter outputs to said encoder inputs and encoded data generated by said encoder are provided to parallel shifter inputs through said encoder outputs.

17. The system of claim 16 further comprising a constellation mapper having a plurality of constellation mapper inputs, wherein said second memory outputs are in communication with a plurality of constellation mapper inputs.

18. The system of claim 16, wherein said first memory and said second memory are registers.

19. The system of claim 1, wherein said encoder is a convolutional encoder.

* * * * *